United States Patent
Matsunaga

(10) Patent No.: US 7,911,947 B2
(45) Date of Patent: Mar. 22, 2011

(54) GATEWAY APPARATUS

(75) Inventor: Toshihiko Matsunaga, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 148 days.

(21) Appl. No.: 12/453,266

(22) Filed: May 5, 2009

(65) Prior Publication Data
US 2009/0296724 A1   Dec. 3, 2009

(30) Foreign Application Priority Data

May 27, 2008   (JP) ................................ 2008-137601

(51) Int. Cl.
*H04L 12/26* (2006.01)
*H04L 12/28* (2006.01)

(52) U.S. Cl. .......................... 370/230; 370/392; 370/401

(58) Field of Classification Search .................. 370/230, 370/254, 255, 389, 392, 401
See application file for complete search history.

(56) References Cited

U.S. PATENT DOCUMENTS

| 7,391,782 | B2 * | 6/2008 | Oguchi ........................ 370/400 |
| 7,489,682 | B2 * | 2/2009 | Kubota ........................ 370/389 |
| 7,583,685 | B2 * | 9/2009 | Ajitomi et al. ................ 370/401 |
| 7,668,115 | B2 * | 2/2010 | Maruyama et al. ........... 370/254 |
| 2005/0163102 | A1 * | 7/2005 | Higashitaniguchi et al. . 370/351 |
| 2005/0169176 | A1 * | 8/2005 | Onoe et al. .................... 370/230 |
| 2010/0232444 | A1 * | 9/2010 | Yazaki ......................... 370/409 |

OTHER PUBLICATIONS

"Echonet Specification, Part 9, Echonet, Gateway Apparatus Specification, Version 321" ( Echonet consortium, Oct. 13, 2005; http://www.echonet.gr.jp/8_kikaku/spec/pdf_v3.21/SpecVer321_09.pdf) p. 1 of specification.

* cited by examiner

*Primary Examiner* — Hong Cho
(74) *Attorney, Agent, or Firm* — Rabin & Berdo, P.C.

(57) ABSTRACT

A gateway apparatus relays a data packet only when a network that is connected to the gateway apparatus itself is identical to a network that is connected to a node associated with a sender's address. The sender's address is carried in the data packet received. Even if there are accesses from a plurality of nodes to a certain node (e.g., sensor node), the gateway apparatus can relay the data packet such that data retrieval takes place appropriately and/or such that node control takes place appropriately.

15 Claims, 7 Drawing Sheets

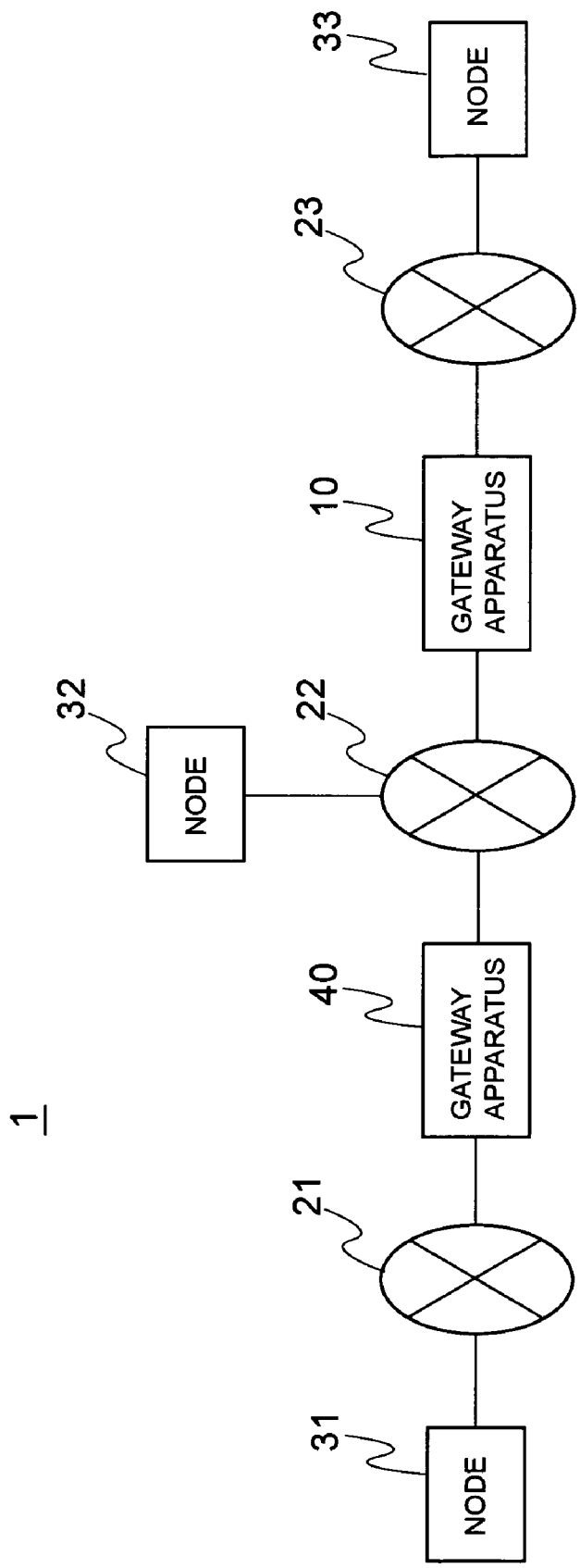

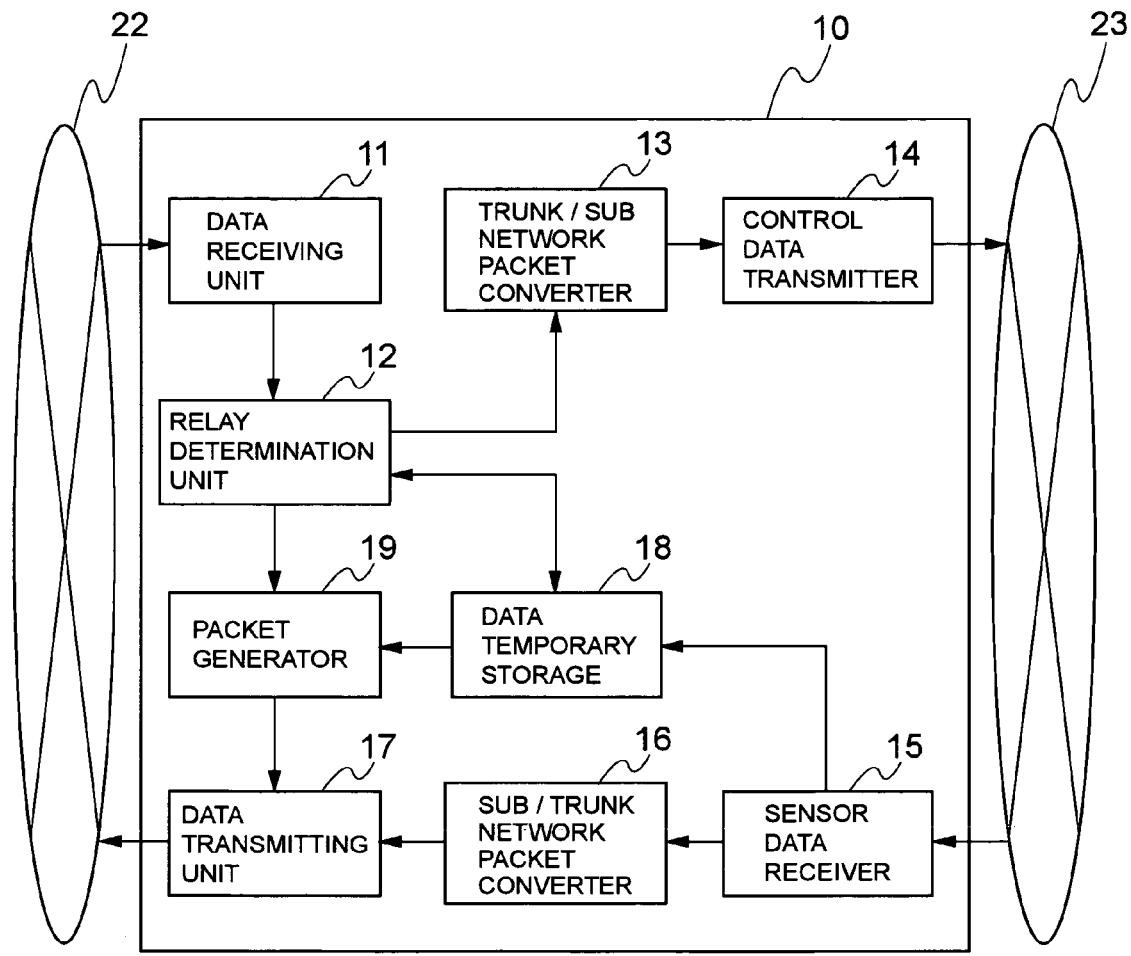

GATEWAY APPARATUS

BACKGROUND OF THE INVENTION

1. Field of the Invention

The present invention relates to a gateway apparatus that can relay a packet between a plurality of networks.

2. Description of the Related Art

There is known a system called "sensor network" or "home network," which can be used inside and outside houses, factories and buildings, to manage, control and operate various objects, equipment and machines. One example of such system can be found in "ECHONET SPECIFICATION, Part 9, ECHONET, Gateway Apparatus Specification, Version 321" (ECHONET consortium, Oct. 13, 2005; http://www.echonet.gr.jp/8_kikaku/spec/pdf_v3.21/SpecVer321_09.pdf). This ECHONET SPECIFICATION defines an industry standard for home networks, which is referred to as ECHONET Gateway Apparatus Specification. In general, it is unusual that a system including sensors and control devices operates independently of other systems. In other words, a system (referred to as "subject system") generally operates in cooperation with other systems (referred to as "external system"). In order to cooperate with an external system, a gateway apparatus is provided at a connection between the subject system and external system. The gateway apparatus relays data between these two systems. The gateway apparatus often has a system security function to provide a secured connection between the subject and external systems. The gateway apparatus may also have an adjusting function to provide a better matching (smooth connection) between the two systems.

SUMMARY OF THE INVENTION

A communication speed and a node performance of a sensor network connected to one end of the gateway apparatus may be different from those of a network connected to the other end of the gateway apparatus. If one low-performance node belongs to the sensor network and a plurality of high-performance nodes belong to the latter network, and the high-performance nodes attempt the accessing to that low-performance node via the gateway apparatus, then access contention occurs. This obstructs the desired data fetching (retrieval) and hinders the desired node control. If excessive access limitations (constraints) are placed on the access from the high-performance nodes, application software running on the high-performance nodes does not operate properly.

An object of the present invention is to provide a gateway apparatus that can smoothly relay a data packet between a particular note (e.g., a sensor node) and an accessing node even if there are one or more other accessing nodes, so that data fetching and node control are performed in an expected manner.

According to one aspect of the present invention, there is provided a gateway apparatus that includes a data receiving unit for receiving a first packet from a first network. The gateway apparatus also includes a control data transmitting unit for causing the first packet to be transmitted to a second network from the data receiving unit. The gateway apparatus also includes a relay determination unit for determining whether a third network connected to a first node that corresponds to a sender's node identifier included in the first packet is identical to the first network. The relay determination unit allows the control data transmitting unit to relay the first packet from the data receiving unit to the second network only when the third network is identical to the first network.

The relay determination unit may have a connection table that defines relationship between network identifiers and node identifiers. The relay determination unit may allow the control data transmitting unit to relay the first packet to the second network from the data receiving unit when a network identifier that corresponds to the sender's node identifier is identical to a gateway-connected network identifier.

The gateway apparatus may also include a packet generator for generating a second packet when the relay determination unit determines that the third network is not identical to the first network. The gateway apparatus may also include a data transmitter for transmitting the second packet to a node that corresponds to a sender's address included in the first packet.

The gateway apparatus may also include a sensor data receiving unit for receiving a third packet from the second network. The gateway apparatus may also include a data storage for storing data included in the third packet received by the sensor data receiving unit. The packet generator may retrieve the data stored in the data storage to generate the second packet that contains the retrieved data.

The relay determination unit may make a determination of whether or not the third network is identical to the first network, when determination setting is given to the relay determination unit. The determination setting may be given depending on a (total) volume of accesses to the second network.

A low-performance node may be connected to the second network and at least one high-performance node may be connected to the first network.

The gateway apparatus may also include a packet format converter for converting a packet format of the first packet from a first format that suits for the first network to a second format that suits for the second network.

The second packet may include information that indicates that an access to the second network is refused.

The relay determination unit may determine whether the first packet includes a data request or a node control data. The relay determination unit may allow the packet generator to generate the second packet if the relay determination unit determines that the first packet includes the data request.

The second packet may include information that indicates that an access to the second network is refused if there is no data stored in the data storage.

According to another aspect of the present invention, there is provided a gateway apparatus that includes a first receiving unit for receiving a first packet from a first network and a second receiving unit for receiving a second packet from a second network. The gateway apparatus also includes a determination unit for determining whether a data request is included in the first packet. The determination unit does not allow the first packet to be sent to the second network if the data request is included in the first packet. The gateway apparatus also includes a data storage for extracting data from the second packet and storing the extracted data. The gateway apparatus also includes a packet generator for preparing a third packet that includes the extracted data. The gateway apparatus also includes a data transmitting unit for sending the third packet to the first network.

If the determination unit determines that a control data is included in the first packet, then the determination unit may allow the first packet to be sent to the second network.

The determination unit may allow the first packet to be sent to the second network if a third network connected to a first node that corresponds to a sender's node identifier included in the first packet is identical to the first network.

The determination unit may allow the first packet to be sent to the second network even if a third network connected to a first node that corresponds to a sender's node identifier included in the first packet is not identical to the first network.

These and other objects, aspects and advantages of the present invention will become more apparent to those skilled in the art when the following detailed description is read and understood in conjunction with the appended claims and drawings.

BRIEF DESCRIPTION OF THE DRAWINGS

FIG. 1 illustrates a block diagram of a network system in accordance with a first embodiment of the present invention.

FIG. 2 illustrates a block diagram of one of gateway apparatus used in the network system shown in FIG. 1.

FIG. 3 illustrates a connection table used in the network system shown in FIG. 1.

DETAILED DESCRIPTION OF THE INVENTION

Figure 4:
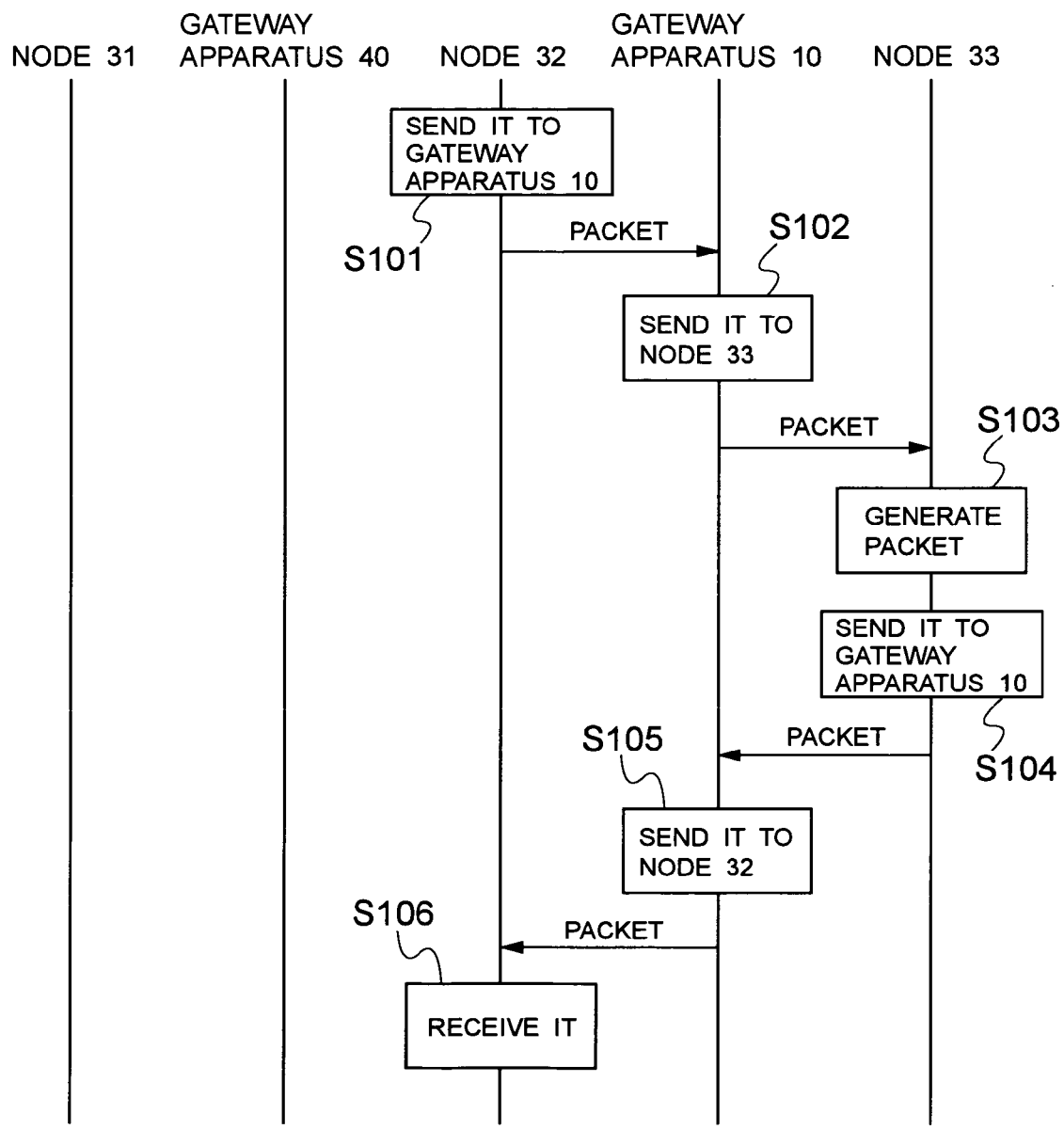
FIG. 4 illustrates a sequence diagram when a first node sends a data transmission request or control command to a second node in the network system shown in FIG. 1.

Embodiments of the present invention will now be described below in detail with reference to the drawings.

First Embodiment

Referring to FIG. 1, a first embodiment of a gateway apparatus according to the present invention will be described.

In an entire networking system 1, a communication network 21 is connected to another communication network 22 over a gateway apparatus 40. The second communication network 22 is connected to a third communication network 23 over a second gateway apparatus 10. The first gateway apparatus 40 relays a packet between the communication networks 21 and 22. The second gateway apparatus 10 relays a packet between the communication networks 22 and 23. A node 31 is connected to the first network 21, another node 32 is connected to the second network 22, and still another node 33 is connected to the third network 23.

The third node 33 has a sensor (i.e., the third node 33 is a sensor node) and is a low-performance node in this embodiment. The first and second nodes 31 and 32 control the third node 33. The first and second nodes can also fetch data from the third node 33. It should be noted that each of the first and second nodes 31 and 32 may also control other nodes and may retrieve data from these nodes (not shown).

The first network 21 is, for example, the Internet. The second network 22 is, for example, a trunk network in a home network. The networks 21 and 23 are connected to the trunk network 22. The networks 21 and 23 can be called sub-networks under the trunk network 22. The nodes 31 and 33 which are connected to the networks 21 and 23 are also present under the trunk network 22. The third network 23 is, for example, a sensor network.

Referring to FIG. 2, an example of the gateway apparatus 10 will be described in detail. The gateway apparatus 10 has a data receiving module 11, a relay determination unit 12, a trunk/sub network packet converter 13, a control date transmitting module 14, a sensor data receiving module 15, a sub/trunk network packet converter 16, a data transmitting module 17, a data temporary memory 18, and a packet generator 19.

The data receiving module 11 receives a packet from the network 22, and refers to the destination address (e.g., IP address) included in the packet. If the data receiving module 11 determines that the destination address is a node (e.g., node 33) connected to the network 23, the data receiving module 11 considers that the packet should be relayed to the network 23. Consequently, the data receiving module 11 takes (imports) the data packet.

The relay determination unit 12 determines whether the data packet received by the data receiving module 11 should be relayed to the downstream. More specifically, the relay determination unit 12 determines that the data packet should be relayed to the downstream only when the network connected to the node that corresponds to the sender's node identifier (e.g., IP address) included in the received packet is identical to the network 22 connected to the gateway apparatus 10 itself. The relay determination unit 12 makes this determination by referring to a connection table 24 (FIG. 3). The relay determination unit 12 has the connection table 24.

Referring now to FIG. 3, the connection table 24 will be described. The connection table 24 has a column for the network identifier (left column in the illustrated table) and another column for node identifier (right column). Each network identifier is unique (specific) to an associated network. Each node identifier is unique to an associated node. The network identifiers T21, T22 and T23 are allocated to the networks 21, 22 and 23 respectively in this embodiment. The node identifiers N21, N22 and N23 are allocated to the nodes 31, 32 and 33 respectively. Because the node 31 is connected to the network 21, the node identifier N31 corresponds to the network identifier T21. Likewise, the node identifier N32 corresponds to the network identifier T22, and the node identifier N33 corresponds to the network identifier T23. As mentioned earlier, the network identifier is, for example, an IP address and the node identifier is, for example, an IP address. It should be noted that the network identifiers and node identifiers do not have to correspond one by one. For example, if a plurality of nodes are connected to the network 21, then a plurality of node identifiers are associated with the network identifier T21.

The relay determination unit 12 refers to the connection table 24 and determines whether the network identifier that corresponds to the sender's node identifier included in the packet received at the data receiving unit 11 coincides with the network identifier T22. Only when the determination answer is yes, the relay determination unit 12 decides that the packet should be relayed. For example, the network identifier of the network 22 connected to the gateway apparatus 10 is called a "gateway-connected network identifier." This gateway-connected network identifier is allotted "T22" and given to the relay determination unit 12 in advance.

If the node identifier (e.g., the sender's address) included in the packet is N32, the relay determination unit 12 determines that the relaying of the packet should be carried out (enabled) because the network identifier T22 associated with the node identifier N32 in the connection table 24 matches the gateway-connected network identifier T22. If the node identifier included in the packet is N31, the relay determination unit 12 determines that the relaying of the packet should not be carried out (disabled) because the network identifier T21 associated with the node identifier N31 in the connection table 24 does not match the gateway-connected network identifier T22. In this manner, whether or not the packet should be relayed is determined by the relay determination unit 12. Thus, the gateway apparatus 10 does not transfer (relay) the packet from the network 22 to the network 23 unconditionally.

After the relay determination unit 12 determines that the packet should be relayed, the trunk/sub network packet converting unit 13 converts the format of the packet from the format that suits for the communication with the network 22 to another format that suits for the communication with the network 23.

Subsequently the control data transmitting module 14 sends the packet, whose format has been modified by the packet converter 13, to the network 23.

The sensor data receiving unit 15 receives the packet from the network 23 and refers to the destination address (e.g., IP address) included in the packet. When it is determined that the destination address represents the node (e.g., node 32) connected to the network 22, the sensor data receiving unit 15 considers that the packet should be relayed to the downstream. Consequently, the sensor data receiving unit 15 imports (takes) the packet.

The sub/trunk network packet converter 16 changes the format of the packet that is received at the sensor data receiving unit 15 from the format that suits for the communication with the network 23 to the format that suits for the communication with the network 22.

The data transmitting unit 17 sends the packet, which is received from the sub/trunk network packet converter 16, to a node (e.g., node 32) connected to the network 22 or to a gateway apparatus (e.g., gateway apparatus 40) connected to the network 22. Also the data transmitting unit 17 sends a response packet or an access refusal notification packet, which is generated by the packet generator 19, to the node (e.g., node 32) connected to the network 22 or to the gateway apparatus (e.g., gateway apparatus 40) connected to the network 22. The access refusal notification packet informs a fact that the access to the destination is refused.

The data temporary storage 18 temporarily stores data that is supplied from at least one node among those nodes which are connected to the network 23. The data temporary storage 18 stores data (e.g., sensor output and time) included in the packet received at the sensor data receiving unit 15. This data storage is carried out node by node.

The packet generator 19 generates a response packet, which includes the data stored in the data temporary storage 18, or an access refusal notification packet, which includes the data indicating the refusal to the access-to-the-destination, in accordance with the determination result of the relay determination unit 12. Each of the response packet and access refusal notification packet is generated in a packet format that suits for the communication in the network 22.

The gateway apparatus 40 may be any gateway device that has an ordinary network connection capability, such as a home gateway device which is provided in a home network and is used for connection to the outside.

Referring to FIG. 4, the procedure of when the node 32 issues a data transmission request or a control command (instructions) to the node 33.

First, the node 32 prepares a packet that includes at least one of two data, namely data for node control (referred to as "node control data") and data for data transmission request (referred to as "transmission request data"). Then, the node 32 sends the packet to the gateway apparatus 10 via the network 22 (Step S101). The node 32 incorporates the destination address (e.g., IP address) and a sender's address (e.g., IP address) in this packet. In the illustrated embodiment, the destination address corresponds to the node 33, and the sender's address corresponds to the node 32.

The gateway apparatus 10 refers to the connection table 24 and determines that the network 22 which is connected to the node 32 is identical to the network 22 which is connected to the gateway apparatus 10 itself. Accordingly, the gateway apparatus 10 decides (considers) that the packet should be relayed. The node 32 corresponds to the sender's address included in the packet sent from the network 22. By referring to the connection table 24, the gateway apparatus 10 can determine (know) that the node 33 that corresponds to the destination address included in the packet is connected to the network 23. The gateway apparatus 10 then sends the packet to the node 33 via the network 23 (Step S102).

If the node 33 determines that the data included in the packet sent from the network 23 is the node control data, the node 33 performs the control based on this node control data. If the node 33 determines that the data included in the packet sent from the network 23 is the transmission request data, the node 33 prepares a packet that includes data-to-be-transmitted (Step S103). Then, the node 33 sends the packet to the gateway apparatus 10 via the network 23 (Step S104). It should be noted that if the data included in the packet sent from the network 23 is the node control data, the node 33 may also send an affirmative or negative acknowledgement signal (ACK signal or NACK signal) to the node 32.

The gateway apparatus 10 refers to the connection table 24 and determines (knows) that the node 32 that corresponds to the destination address included in the packet sent from the network 23 is connected to the network 22. Then, the gateway apparatus 10 sends the packet to the node 32 via the network 22 (Step S105).

The node 32 receives the packet from the network 22 (Step S106) and obtains the data included in the packet.

Figure 5:
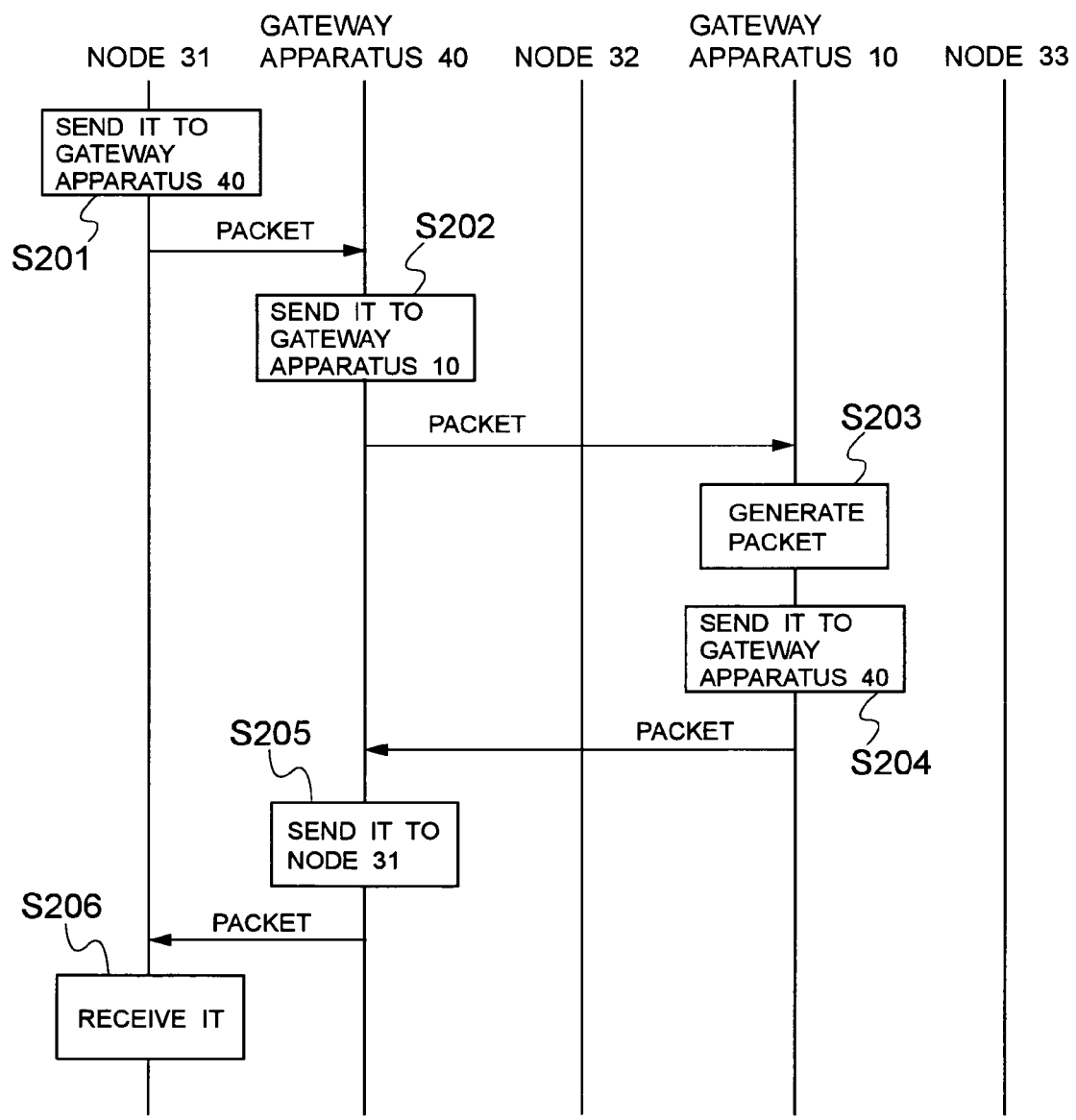
FIG. 5 is a sequence diagram when a third node sends a data transmission request or control command to the second node in the network system shown in FIG. 1.

Referring now to FIG. 5, the procedure of when the node 31 issues a data transmission request or a control command to the node 33.

First, the node 31 prepares a packet that includes at least one of the node control data and the transmission request data. Then, the node 31 sends the packet to the gateway apparatus 40 via the network 21 (Step S201). In the illustrated embodiment, the destination address corresponds to (indicates) the node 33, and the sender's address corresponds to (indicates) the node 31.

The gateway apparatus 40 determines that the packet should be relayed, on the basis of the destination address and a routing table. The destination address is included in the packet sent from the network 21. The routing table is provided in the gateway apparatus 40 and defines the relation (matching) between the networks and nodes. The gateway apparatus 40 sends the packet to the network 22 (Step S202).

By referring to the connection table 24, the gateway apparatus 10 determines (knows) that the network 21 that is connected to the node 31 is not identical to the network 22 that is connected to the gateway apparatus 10 itself. The node 31 corresponds to the sender's address included in the packet sent from the network 22. The gateway apparatus 10 then considers that the relaying of the packet should be disabled. If the gateway apparatus 10 determines that the data included in the packet sent from the network 22 is the transmission request data, the gateway apparatus 10 generates a packet that includes the data stored in the temporary storage 18 (Step S203). The data is retrieved in advance from the node 33 and stored in the temporary storage 18. The gateway apparatus 10 sends this packet to the gateway apparatus 40 via the network 22 (Step S204). It should be noted that if it is determined that the data included in the packet sent from the network 22 is the node control data, the gateway apparatus 40 may not relay the packet. In this case, the gateway apparatus 40 does not perform Steps S203 and S204.

The gateway apparatus 40 determines that the data packet should be relayed, on the basis of the destination address and the routing table. The destination address is included in the data packet sent from the network 22. The routing table is provided in the gateway apparatus 40. The gateway apparatus 40 sends the data packet to the network 21 (Step S205).

The node 31 receives the packet from the network 21 (Step S206) and obtains the data included in the packet.

Figure 6:
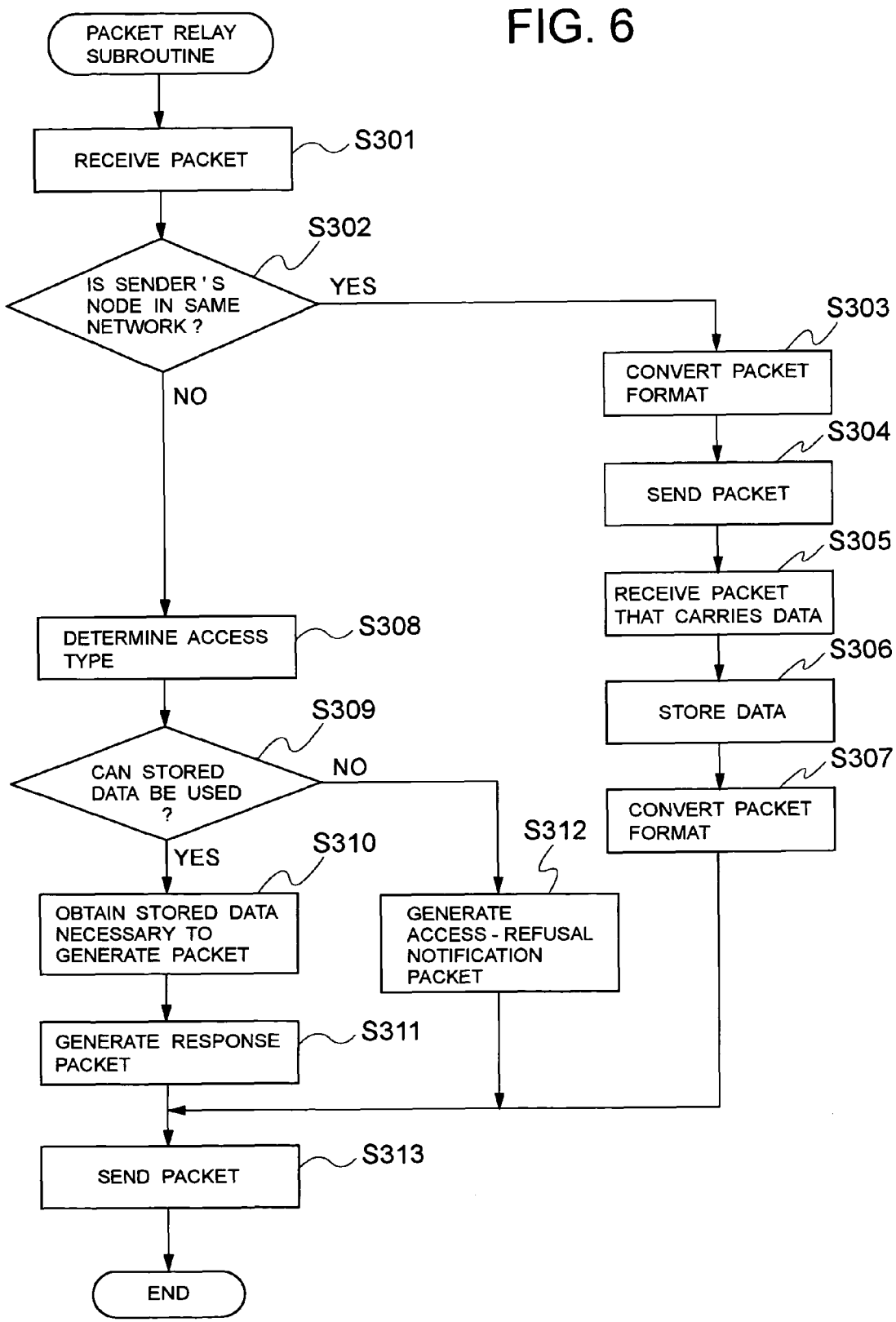
FIG. 6 is a flowchart of packet relaying routine that is performed by the gateway apparatus shown in FIG. 2.

Referring to a flowchart shown in FIG. 6, the routine for the packet relay in the gateway apparatus 10 will be described. The illustrated flowchart will explain the procedure of when the gateway apparatus 10 receives the packet from the network 22.

The data receiving unit 11 receives the packet from the network 22 (Step S301).

The relay determination unit 12 refers to the connection table 24 and determines whether a network which is connected to a node in question is identical to the network 22 which is connected to the gateway apparatus 10 itself (Step S302). The node in question corresponds to the sender's address included in the packet received by the data receiving unit 11. More specifically, the relay determination unit 12 considers that the packet should be relayed, only when the network identifier that corresponds to the sender's node identifier (i.e., sender's IP address) included in the packet received at the data receiving unit 11 is identical to the gateway-connected network identifier. The gateway-connected network identifier is T22, which is the same as the network identifier T22 of the network 22 connected to the gateway apparatus 10. This gateway-connected network identifier is given to the relay determination unit 12 in advance.

The trunk/sub network packet converter 13 converts the packet format of the packet received at the data receiving unit 11 from the packet format that suits for the communication in the network 22 to another packet format that suits for the communication in the network 23, if the relay determination unit 12 determines at Step S302 that the networks are the same (Step S303).

The control data transmitting unit 14 sends to the network 23 the packet whose packet format has been changed by the packet converter 13 (Step S304).

The sensor data receiving unit 15 receives the packet from the node 33 via the network 23 (Step S305). This packet contains sensor data (sensor detection values). The sensor data receiving unit 15 refers to the destination address (e.g., IP address) included in the packet, and if the sensor data receiving unit 15 determines that the destination address represents a node (e.g., node 32) connected to the network 22, then the sensor data receiving unit 15 considers that the packet should be relayed to the network 22. Accordingly, the sensor data receiving unit 15 takes (imports) the packet.

The data temporary storage 18 holds data (e.g., sensor data and destination address) included in the packet received at the sensor data receiving unit 15 (Step S306).

It should be noted that Steps S305 and S306 may not necessarily be executed after Step S304 in which the control data transmitting unit 14 sends the packet. For example, the sensor data receiving unit 15 may be designed to receive the packet, which carries the sensor data and associated data, from the node 33 via the network 23 periodically, and the data temporary storage 18 may take (import) the sensor data and associated data upon each packet reception.

The sub/trunk network packet converter 16 converts the format of the packet received by the sensor data receiving unit 15 from the packet format that suits for the communication in the network 23 to the packet format that suits for the communication in the network 22 (Step S307).

If the relay determination unit 12 considers at Step S302 that the networks do not coincide with each other, then the relay determination unit 12 determines whether the data included in the packet received at the data receiving unit 11 is the node control data or the transmission request data (i.e., whether this is the access for control or for data transmission request). In other words, the relay determination unit 12 determines the access type (Step S308).

The packet generating unit 19 determines whether the sensor data and associated data in the temporary storage 18 are usable (Step S309), if the relay determination unit 12 determines that the access is for the data transmission request. The packet generating unit 19 considers that the sensor data and associated data in the temporary storage 18 are usable if the data of the node that corresponds to the destination address included in the packet received at the data receiving unit 11 is stored in the temporary storage 18. Even if the sensor data and associated data are present in the temporary storage 18, the setting may indicate that these data should not be used or the setting may indicate that these data cannot be used for node control. In either case, the packet generating unit 19 determines that the sensor data and associated data in the temporary storage 18 are not usable.

The packet generating unit 19 retrieves the sensor data and associated data from the data temporary storage 18 if it is determined that these data are usable (Step S310). Subsequently, the packet generating unit 19 generates a response packet that includes the retrieved data, in a packet format that suits for the communication in the network 22 (Step S311).

If it is determined at Step S309 that the data are not stored in the temporary storage 18, the packet generating unit 19 considers that the sensor data and associated data in the temporary storage 18 are not usable. Likewise, if the relay determination unit 12 determines that the access is for control (Step S308), then the packet generating unit 19 considers that the sensor data and associated data in the temporary storage 18 are not usable (Step S309). In either case, the packet generating unit 19 produces an access refusal notification packet (Step S312). The access refusal notification packet includes data that indicates a fact that the access to the destination node is refused.

The packet generating unit 19 considers that the sender's address included in the packet received at the data receiving unit 11 is the destination address of the generated packet. The data transmission unit 17 sends the access refusal notification packet, which is prepared at Step S312, to the network 22 or sends the response packet, which is prepared at step S311, to the network 22 (Step S313).

As described above, the gateway apparatus 10 in the illustrated embodiment has the connection table 24 that defines the relationship between nodes and associated networks. Based on the connection table and the sender's address included in the received packet, the gateway apparatus 10 determines whether the relaying of the received packet should be disabled or enabled. Only when the network connected to the node that corresponds to the sender's address included in the packet is identical to the network 22 connected to the gateway apparatus 10 itself, the gateway apparatus 10 determines that the relaying of the packet should be enabled. In other words, the gateway apparatus 10 gives the priority to the access from a proximal node over the access from a distal node.

If the node 33 connected to the network 23, which is the relay destination of the gateway apparatus 10, is a node for regulating the sensor function (referred to as "sensor node"), a plurality of nodes may make accesses to the sensor node (e.g., there may be a plurality of accesses for sensor data retrieval and for sensor node control). Because the priority is given to a certain access over other accesses (or because of the above-described access limitation), the access from a node which is near (closer) to the sensor node does not contend (compete) against the access from a far node. Thus, the retrieval of the sensor data and associated data as well as the controlling of the sensor node can be performed smoothly.

As described above, the gateway apparatus 10 receives packet, which includes the sensor data for example, from the node 33 over the network 23 and holds the sensor data in the temporary storage 18 in advance. When the gateway apparatus 10 receives a packet that includes data transmission request data (referred to as "data transmission request packet"), the gateway apparatus 10 does not relay the packet to the node 33. Rather, the gateway apparatus 10 generates a response packet that includes the data held in the temporary storage 18, and sends it to the sender's node (i.e., the node that issues the data transmission request packet). Therefore, the access contention to the node 33 is avoided, and the data obtained from the node 33 is sent to the data requesting node that has issued the data transmission request packet.

In general, if there are many hops, a considerable length of time is needed until the data requesting node receives a response packet from the destination node. In the illustrated embodiment, however, the gateway apparatus that handles the hop (hopping) transmits the response packet or access refusal notification packet, so that the number of hopping is reduced. Accordingly, a length of time until the data requesting node receives a response packet or an access refusal notification packet is reduced.

Second Embodiment

The first embodiment deals with a case where no packets are relayed if the network connected to the packet sending node is different from the network 22 connected to the gateway apparatus 10 itself. A second embodiment deals with another case.

Figure 7:
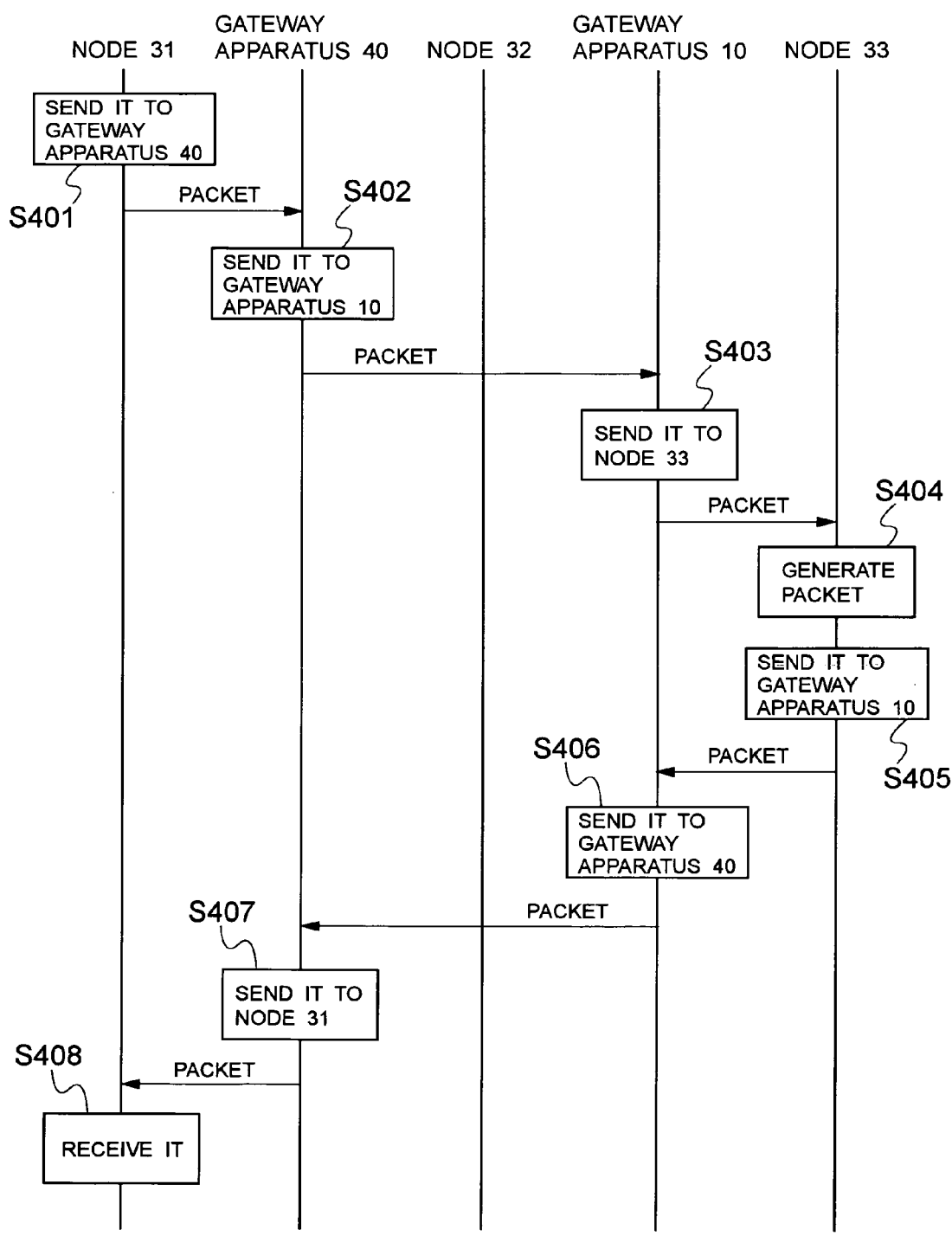
FIG. 7 is similar to FIG. 5 and depicts a sequence diagram when the third node sends a data transmission request or control command to the second node in a second embodiment of the present invention.

Referring to FIG. 7, depicted is another procedure of when the node 31 issues a data transmission request or a control command to the node 33.

Steps S401 and S402 are the same steps as Steps S201 and S202 in FIG. 5. Even if it is determined that the network 21 connected to the node 31 which is a packet sender is not the network 22, the gateway apparatus 10 relays the packet to the network 23 when the relay determination unit 12 determines that other nodes are not issuing control commands to the node 33 or when the traffic (access) to the network 23 is not crowded (Step S403). It should be noted that the relay determination unit 12 may make a determination on whether or not to relay the packet to the network 23, only when the relay-determination setting is given in advance. The relay determination unit 12 does not perform the relay determination if no-relay-determination setting is given in advance.

When the packet relaying is admitted, the node 33 that has received the packet generates a packet (Step S404) and sends the generated packet to the gateway apparatus 10 (Step S405). The gateway apparatus 40 sends the packet to the network 22 based on the destination address included in the packet received from the node 33 (Step S406). Steps S407 and S408 are the same as Steps S205 and S206 in FIG. 5. In this way, the gateway apparatus 10 may be able to enable or disable the packet relaying in a flexible manner.

Figure 8:
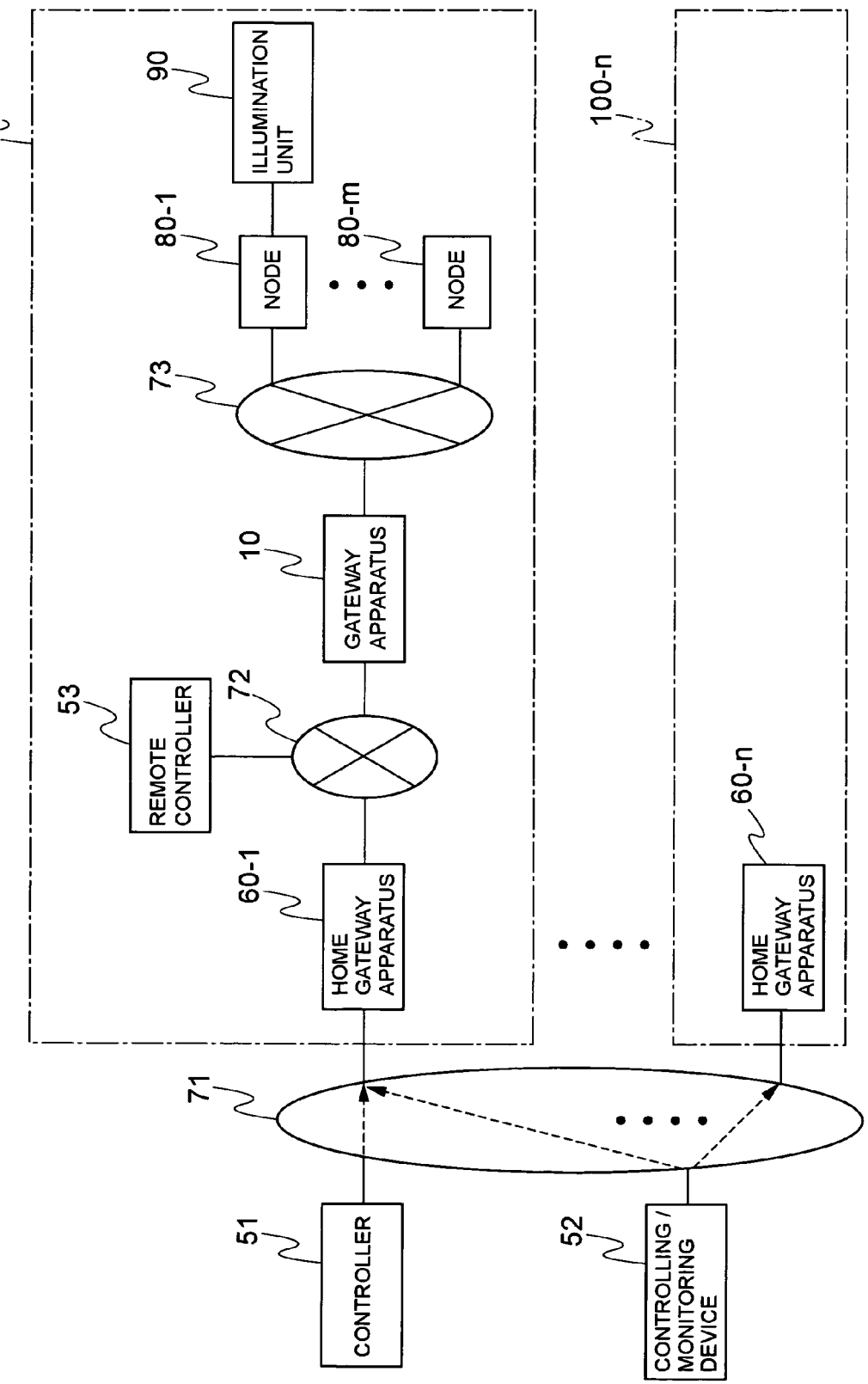
FIG. 8 illustrates a block diagram of a home network that uses the gateway apparatus of the present invention.

Referring to FIG. 8, a home network 2 is illustrated that includes the gateway apparatus 10. An outside network (i.e., network outside a house) 71 is connected to an in-house trunk network 72 via a home gateway apparatus 60-1. The in-house trunk network 72 is connected to a sensor network 73 via the gateway apparatus 10. A control device 51 is connected to the network 71, and a control device/monitoring device 52 is also connected to the network 71. Another controller (remote controller) 53 is connected to the in-house network 72. A plurality of nodes 80-1 to 80-*m* (m is a positive integer) are connected to the sensor network 73. A lighting or illumination device 90 is connected to the node 80-1.

The gateway apparatus 10, home gateway apparatus 60-1, remote controller 53, in-house trunk network 72, sensor network 73, nodes 80-1 to 80-*m* and illumination device 90 are all provided in a house 100-1. Each of the houses 100-2 to 100-*n* (n is a positive integer) has the same configuration as the house 100-1. The home gateway apparatus 60-2 to 60-*n* are connected to the outside network 71.

When the relay determination unit 12 considers that the traffic to the sensor network 73 is not crowded or when the relay-determination setting is given to the relay determination unit 12, then the gateway apparatus 10 relays the packet, which is received from the remote controller 53, to the sensor network 73 upon receiving the packet from the remote controller 53 and the packet from the control device 51. In other words, the gateway apparatus 10 gives a priority to the packet received from the remote controller 53 over the packet received from the control device 51. If no one is present in the house 100-1, no-relay-determination setting may be given to the relay determination unit 12 of the gateway apparatus 10. The no-relay-determination setting is setting in which the relay determination unit does not make a determination on the relaying or no relaying. On the other hand, if someone is present in the house 100-1, the relay-determination setting may be given so that it is possible to prevent the access from the remote controller 53 from contending with the access from the controller 51 without placing an excessive access-limitation.

If the number of nodes to be controlled by the outside controller/monitor 52 is large and the number of packet relaying is large, then an amount of traffic increases and/or the number of hopping increases. As a result, the time required until receiving a response packet from the destination node becomes longer. In other words, the response time becomes longer. In this embodiment, however, the response packet is sent back from the gateway apparatus 10, as in the case of the first embodiment. This reduces the number of hopping so that the response time does not become longer.

This application is based on Japanese Patent Application No. 2008-137601 filed on May 27, 2008 and the entire disclosure thereof is incorporated herein by reference.

What is claimed is:

1. A gateway apparatus comprising:
a data receiving unit for receiving a first packet from a first network;
a control data transmitting unit for causing the first packet to be transmitted to a second network from the data receiving unit; and
a relay determination unit for determining whether a third network connected to a first node that corresponds to a sender's node identifier included in the first packet is identical to the first network, and for allowing the control data transmitting unit to relay the first packet from the data receiving unit to the second network only when the third network is identical to the first network.

2. The gateway apparatus according to claim 1, wherein the relay determination unit has a connection table that defines relationship between network identifiers and node identifiers, and the relay determination unit allows the control data transmitting unit to relay the first packet to the second network from the data receiving unit when a network identifier that corresponds to the sender's node identifier is identical to a gateway-connected network identifier.

3. The gateway apparatus according to claim 1 further comprising:
- a packet generator for generating a second packet when the relay determination unit determines that the third network is not identical to the first network; and
- a data transmitter for transmitting the second packet to a node that corresponds to a sender's address included in the first packet.

4. The gateway apparatus according to claim 3 further comprising:
- a sensor data receiving unit for receiving a third packet from the second network; and
- a data storage for storing data included in the third packet received by the sensor data receiving unit, wherein the packet generator generates the second packet that contains the data stored in the data storage.

5. The gateway apparatus according to claim 4, wherein the relay determination unit determines whether the first packet includes a data request or a node control data, and the relay determination unit allows the packet generator to generate the second packet if the relay determination unit determines that the first packet includes the data request.

6. The gateway apparatus according to claim 4, wherein the second packet includes information that indicates a refused access to the second network if there is no data stored in the data storage.

7. The gateway apparatus according to claim 1, wherein the relay determination unit makes a determination of whether or not the third network is identical to the first network, when determination setting is given to the relay determination unit.

8. The gateway apparatus according to claim 7, wherein the determination setting is given depending on a volume of accesses to the second network.

9. The gateway apparatus according to claim 1, wherein a low-performance node is connected to the second network and at least one high-performance node is connected to the first network.

10. The gateway apparatus according to claim 1 further comprising a packet format converter for converting a packet format of the first packet from a first format that suits for the first network to a second format that suits for the second network.

11. The gateway apparatus according to claim 1, wherein the second packet includes information that indicates a refused access to the second network.

12. A gateway apparatus connected between a first network and a second network, comprising:
- a first receiving unit for receiving a first packet from the first network;
- a second receiving unit for receiving a second packet from the second network;
- a determination unit for determining whether a data request is included in the first packet, and not for allowing the first packet to be sent to the second network if the determination unit determines that the data request is included in the first packet;
- a data storage for extracting data from the second packet and storing the extracted data;
- a packet generator for preparing a third packet that includes the extracted data; and
- a data transmitting unit for sending the third packet to the first network if the determination unit determines that the data request is included in the first packet.

13. The gateway apparatus according to claim 12, wherein if the determination unit determines that a control data is included in the first packet, the determination unit allows the first packet to be sent to the second network.

14. The gateway apparatus according to claim 13, wherein the determination unit allows the first packet to be sent to the second network if a third network connected to a first node that corresponds to a sender's node identifier included in the first packet is identical to the first network.

15. The gateway apparatus according to claim 13, wherein the determination unit allows the first packet to be sent to the second network even if a third network connected to a first node that corresponds to a sender's node identifier included in the first packet is not identical to the first network.

* * * * *